United States Patent [19]

Simon

[11] 4,449,217

[45] May 15, 1984

[54] PCM COMMUNICATION SYSTEM AND METHOD OF OPERATION

[75] Inventor: Joachim W. Simon, Goslar, Fed. Rep. of Germany

[73] Assignee: Nixdorf Computer AG, Fed. Rep. of Germany

[21] Appl. No.: 233,816

[22] Filed: Feb. 12, 1981

[30] Foreign Application Priority Data

Feb. 15, 1980 [DE] Fed. Rep. of Germany ....... 3005739

[51] Int. Cl.³ .............................................. H04M 3/56
[52] U.S. Cl. ..................................................... 370/62
[58] Field of Search .......... 370/62; 179/1 CN, 18 BC

[56] References Cited

U.S. PATENT DOCUMENTS

| 3,984,643 | 10/1976 | Inrig et al. | 370/62 |
| 4,229,814 | 10/1980 | Betts | 370/62 |
| 4,280,216 | 7/1981 | Zeitrag | 370/62 |
| 4,301,531 | 11/1981 | Lubin | 370/62 |

Primary Examiner—Marc E. Bookbinder
Attorney, Agent, or Firm—Krass, Young, and Schivley

[57] ABSTRACT

Process for control of the transmission of PCM signals between connectors of a PCM time-division multiplex communication network in a conference service and circuit for carrying out the process.

9 Claims, 5 Drawing Figures

PCM COMMUNICATION SYSTEM AND METHOD OF OPERATION

DESCRIPTION

1. Technical Field

The invention relates to a process for control of the transmission of PCM signals between subscriber stations of a PCM time-division multiplex communications network in a conference service by means of a central conference control circuit in which a central processing unit allots to each station involved in a connection a transmitting pulse with cyclically repeated transmission time slots occurring in sequential pulse brackets of time frames and a receiving pulse with cyclically repeated receiving time slot occurring in sequential impulse brackets, in which in one pulse bracket, PCM signals emitted from the conference related stations and received in the central conference control circuit are summed algebraically, with linearization if necessary, stored temporarily, and for transmission to the respective conference related station are subjected to a partial summation. With the elimination of the PCM signal emitted by the respective stations, in which summation the PCM signals corresponding to the partial sums, after delinearization if necessary are transmitted during another pulse bracket to the conference related stations, and in which time slots are provided within a predetermined period of the respective pulse bracket for the transmission of signals not relevant to the conference.

Moreover, the invention relates to a circuit arrangement for carrying out this process.

2. Background Art

A process of the type mentioned at the start is known from German Offenlegungsschrift No. 2,617,344, for example. In this process the PCM signals of one pulse bracket received in the central conference control circuit are first stored. Then they are processed in the prescribed way and at the same time PCM signals of the next successive pulse bracket are stored. Therewith, intermediate results of the signal processing for each conference connection or station are stored and from this final results for each conference station are derived and these final results are transmitted in turn to the conference related stations with the start of the next succeeding pulse bracket.

Through the storage of the received PCM signals during one pulse bracket before the processing proper and the further storage of intermediate results, a delay of two pulse brackets between the receiving and the transmitting process in the central conference control circuit is unavoidable with this process. This in turn involves the disadvantage that within the central conference control circuit a relatively higher expense for signal transmission between the individual storage devices is caused. This is of course particularly significant when a parallel signal processing or signal transmission is carried out with a larger number of time slots per pulse bracket. But for reasons to be described below, a parallel signal processing and signal transmission is advantageous for a PCM time-division multiplex communications network.

DISCLOSURE OF THE INVENTION

It is the problem of the invention to provide a process and apparatus through which the signal processing in a central conference control circuit takes place substantially more quickly, so that an effective utilization of the advantages of a parallel signal processing and signal transmission is possible, the result of which is to avoid any high expense for relatively long temporary storage of signals.

This problem is solved, for a process of the type mentioned at the start, by having the algebraic summation take place immediately upon the receipt of the PCM signals and having these signals at the same time temporarily stored in a manner specific to the receiving station only until the expiration of the next succeeding period of signals not relevant to the conference, at most, having the partial summation and the temporary storage of the partial sums take place in this period and having the PCM signals corresponding to the partial sums transmitted to the conference related stations immediately after this period.

The invention renders superfluous any exchange of storage content of all the PCM signals received in the central conference control circuit in one pulse bracket before their processing begins. It is essential for this that the received PCM signals upon their arrival are respectively transmitted to a summing unit so that even during the respective current pulse bracket a summing function is taking place, and then at a certain moment of time within one pulse bracket the signal sums are available for all conference related stations. At the same time, and therefore parallel to this process, each individual PCM signal received is stored temporarily only until the start of the next succeeding period of signals not relevant to the conference, at most, so that it is available after summation of the signal sum, in order by subtraction to obtain the partial sum of PCM signals to be transmitted to the respective connector. The invention is not by any means exhausted by this practically delay-free start of the signal processing but rather it is additionally provided that the partial summation for deriving the PCM signals to be transmitted to the conference related stations also takes place in the period of signals not relevant to the conference. This depends on the principle applied in time-division multiplex switching technology of dividing a pulse bracket or time frame into time slots allotted to signals relevant to the conference and into time slots allotted to signals not relevant to the conference. Such signals not relevant to the conference are audible signals for signaling certain states of switching and operation of the switching system, e.g., office selection signals, internal selection signals, free-line signals, busy signals, attention signals, as well as other signals. Now if a particular pulse bracket of signals relevant to the conference can no longer be transmitted or received, then this time can be utilized for algebraically deriving the partial signal sums which must be transmitted to the conference related stations. In this way, it becomes possible to transmit these partial sums to the conference related stations immediately after the period of signals not relevant to the conference.

Thus, the invention avoids a long delay between the respective receiving and transmitting process, so that even the corresponding expense for signal transmission between relatively large storage units is not required. Apart from a summing unit with summing register, only temporary stores are required, which must temporarily store the received individual PCM signals and the partial sum signals which are to be transmitted to the conference related stations, store them for a time which in any case is shorter than the time of one pulse bracket.

A further development of the invention is made by having the period of signals not relevant to the conference provided at the end of the respective pulse bracket, having the received PCM signals stored temporarily for the duration of the respective current pulse bracket, at most, and having the transmission action start with the start of the pulse bracket immediately following the current pulse bracket. The result of this further development is that the control of the signal processing in the central conference control circuit is simplified as a whole, since the signal processing in each pulse bracket is terminated with the end of this pulse bracket and the determining period for it coincides with the respective current pulse bracket.

The central processing unit provided in a PCM time-division multiplex communication network assigns relative addresses to the conference related stations, which addresses are necessary for setting up and maintaining the conference connection. Now, the process according to the invention is advantageously carried out in such a way that these relative addresses are also used for the temporary storage of the received PCM signals and of the partial sums as well as for transmitting the partial sums. Therefore, no special process steps for calculating internal storage addresses are required in the central conference control circuit.

It is especially advantageous to have the partial summation as well as the temporary storage of the sums controlled by auxiliary clock signals the frequency of which is preferably double that of the time slot sequence clock signal. Thereby, it is possible to include a relatively large number of conference related stations in one conference connection even when relatively few time slots are available within the period of non-conference relevant signals. The calculation of partial sums from the temporarily stored individual PCM signals and the signal sum by subtraction takes place with practically no delay, so that two such calculations, including writing in a temporary transmission memory, can be carried out within one time slot interval.

According to a further development of the invention, the read/write pulse and the relative address signals for triggering temporary memories are generated separately within the central conference control circuit for the receiving and the transmission operation during the period of conference relevant signals in one pulse bracket. This corresponds to the fact that in a time-division multiplex switching system the time slot sequence clock pulse and the related synchronization signals for the receiving and the transmitting operation, though they are synchronous, are not necessarily isochronal in position. Relative shifts of one to two clock pulse periods are possible between the transmission and the receiving control signals.

The practically delay-free mode of operation of the process where PCM signals are received by the different conference related stations offers a very simple procedure for producing in the central conference control circuit relative address signals and the respectively assigned signals which specify a set time slot, which signals can be used as read/write pulses for the temporary storage. For this, it is advantageous for the process to be carried out in such a way that in receiving and in transmitting, controlled respectively by the receiving and the transmitting time slot sequence clock pulse, a modulo-N address counting takes place for a relative address register and for a receiving and a transmitting time slot register, the read/write control of which is activated in accordance with the assignment of the relative addresses to definite receiving and transmitting time slots, where N is the number of time slots per pulse bracket.

This further development. requires only two relatively small registers, which store the relative addresses and time slot set commands emitted by the central processing unit in time sequence. For this the registers need only have a capacity corresponding to only part of the respective pulse bracket, which capacity can carry the signals relevant to the conference when the partial summation as well as the temporary storage of the latter are controlled by auxiliary clock signals in the manner described.

For this the two registers are operated in such a way that the respective read/write control, cyclically with the address counting, in the first half clock pulse of a receiving or transmitting time slot sequence clock signal causes a reading of the receiving or transmitting time slot register and in the second half clock pulse causes a writing of the contents which have been read, if necessary after updating through a time slot set command given by the control processing unit in connection with an allotted relative address, which at the same time is written in the relative address register, and that when a set receiving or transmitting time slot occurs in the operation of the cyclic read/write operation, the read/write control causes a reading of the contents of the respective relative address register and time slot register and a relaying of the signal read as a relative address signal and write pulse for temporary storage of the received PCM signals or a relaying of the signals read on relative address signals and read pulses for the transmission of partial sums to the conference related stations.

This mode of operation of the process, as will be evident below, makes possible minimizing the required expenditure of circuitry and, despite this, made changes in only a single storage location corresponding to one bit. This particularly affects the space and power required for the registers, which are substantially lower than with the use of store structures operating on another principle with random access.

It may be noted that the auxiliary clock pulse control of the relative address emission, as described further above, can also be carried out at more than twice the time slot sequence clock pulse frequency. Thereby, it is possible to increase further the number of conference related stations per processing channel. Therewith, it is also possible to have the adder-subtractor units used work in a multiplex operation.

A circuit arrangement for carrying out the process according to the invention, in agreement with the state of the art of German Offenlegungschrift No. 2,617,344, contains a processing circuit, connected by way of a receiver or a transmitter to the multiplex line of the PCM time-division multiplex communication network, for the PCM signals received from the conference related stations, which if necessary contains an expander circuit for linearizing the PCM signals received, an adder-subtractor unit with summing register allotted to it, and if necessary a compressor circuit for delinearizing the PCM signals to be transmitted as well as temporary memories, and the operation of which is controlled by control signals and relative address signals, which are derived by way of logic control circuits from time slot set commands, time slot sequence clock pulse signals, time slot synchronizing signals and relative addresses received by the control processing unit.

This circuit arrangement is embodied, according to a further expression of the inventive concept in a form such that the processing circuits between receiver and transmitter includes at least one processing channel which contains, parallel to one another, a receiving storage register and an adder-subtractor unit with summing register, the subtracting part of which is connected with the output of the receiving storage register, as well as a transmitting storage register connected after this parallel arrangement.

This simple construction of the circuit arrangement arises from the basic concept of the invention of dispensing with any storage content exchange of the PCM signals received from conference related stations before the start of their processing into partial sums and moreover of utilizing the period of a pulse bracket in which no further conference related signals occur.

It is advantageous for the circuit arrangement to be further developed in such a way that a plurality of processing channels parallel to one another are provided between receiver and transmitter, the control signals and relative address signals of which are derived by way of logic control circuits common to them.

This design of the switching arrangement offers a very substantial advantage, which is that the number of conference related stations can be increased above the number which is actually prescribed by the width of a pulse bracket period of non-conference relevant signals. If a plurality of processing channels parallel to one another are present between receiver and transmitter in the central conference control circuit, then at the same time a plurality of conference connectors can be developed by having the control criteria of the processing channels emitted by the central processing unit suitably assigned. It is then possible to provide a time slot of the period of non-conference relevant signals not for a true conference related connector, but rather to assign a dummy criterion to this time slot in two processing channels, by which it is possible to exchange the PCM signal sums of the partial conferences of the individual processing channels with one another, so that in the respective summing registers of a processing channel they run up the total call signal sum. The effect of this process is that the partial sum of the respective other partial conference is received in the related processing channel delayed by one pulse bracket, which however has practically no effect on the quality of the call.

Further details and process and circuit advantages of the invention are seen from the following description of an embodiment example on the basis of the Figures.

DETAILED DESCRIPTION OF ILLUSTRATIVE EMBODIMENTS

The process to be described in the following serves to evolve conference connections between connectors of a PCM time-division multiplex communication network, in which stations are understood to mean subscriber's stations, such as tone generators for producing audible tones or also sound recording apparatus. The process operates with the parallel transmission of PCM signals with a word length of 8 bits, with the use of a periodically repeating pulse bracket with a repetition frequency of 8 kHz and with 256 time slots. The process obviously can also be used in connection with a serial transmission of the PCM signals, in which case suitable series-parallel or parallel-series converters (or dynamicizers) must then be provided for the central conference control circuit.

With a pulse bracket repetition frequency and scanning frequency (or sampling rate) of 8 kHz of the signal to be transmitted, the result is a transmission frequency range of up to 4 kHz. The analogous scanning values of the momentary signal alternating current are usually encoded nonlinearly, and each scanning value is transmitted with a word length of 8 bits. Then a transmission rate of 64 kbit/sec. is required per signal channel. Moreover, in long-distance (or toll exchange) systems it is customary to transmit up to 32 speech channels serially, so that a transmission rate of 2.048 mbit/sec. results. However, in PBX technology considerably more time slots or speech channels are required in order to achieve the respective necessary traffic capacity. This requirement is fulfilled by the parallel transmission of PCM signals with a periodic pulse bracket 125 microseconds long and a system clock frequency of 2.048 mHz with 256 time slots per pulse bracket.

Figure 1:
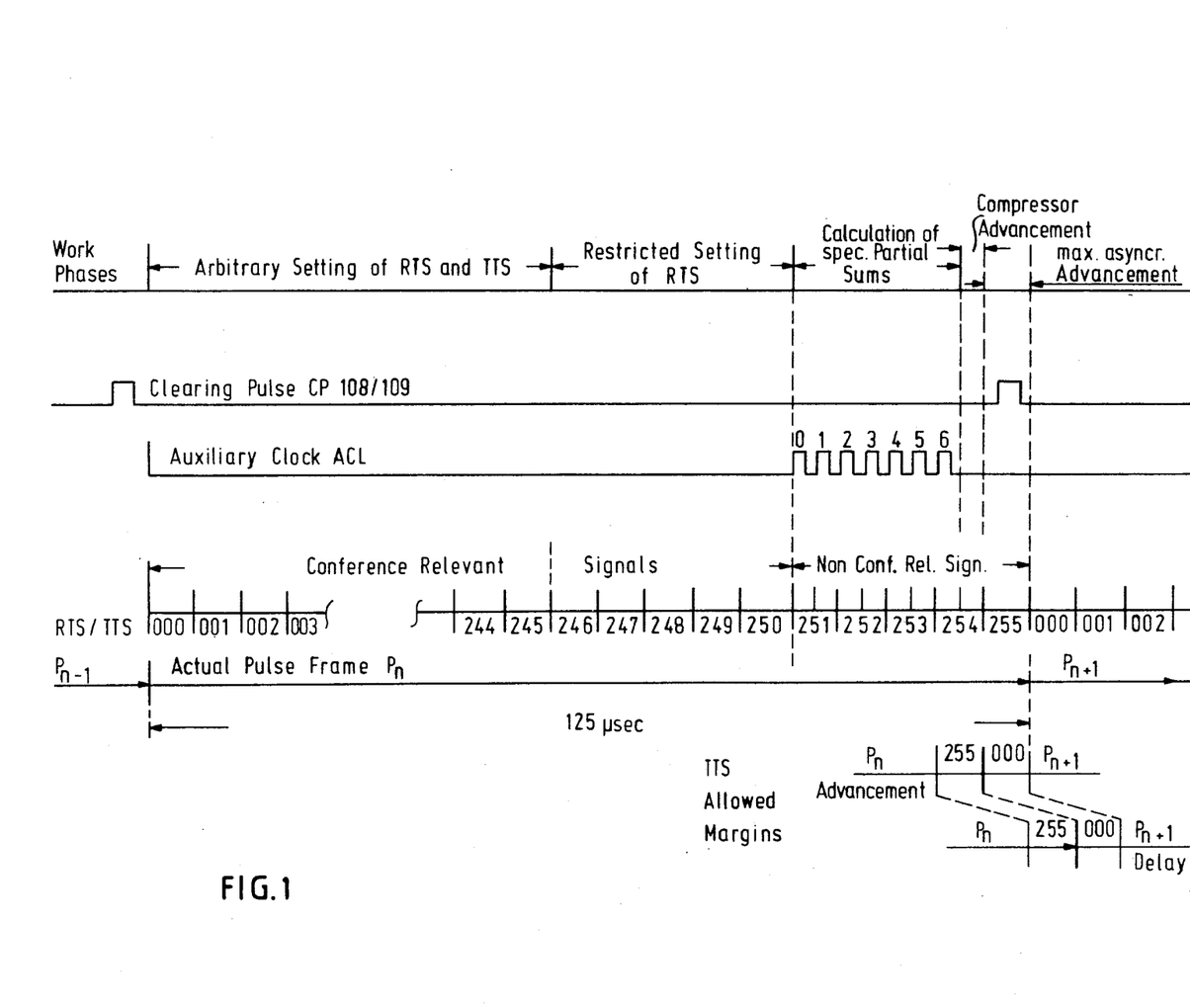
FIG. 1 shows a schematic representation of the time cycle of one pulse bracket and of the related functions in a conference control circuit.

FIG. 1 now shows as one example of the invention, for such a transmission principle, the individual operating phases during a current pulse bracket $P_n$ which is 125 microseconds long. The pulse bracket $P_n$ is divided into 256 time slots RTS, which are numbered from 000 to 255. As stated already, the pulse bracket is also divided into two periods which are provided for the transmission of conference-relevant signals and non-conference-relevant signals. The time slots 000 to 250 are allotted to conference-relevant-signals and the time slots 251–255 to non-conference-relevant signals. These latter are for example audible tones for signaling certain switching or operating states of the switching system. During this period of a pulse bracket, therefore, no signals can be received from or transmitted to the conference-related stations on the central conference control circuit.

As is seen from FIG. 1, during the period of non-conference-relevant signals the auxiliary clock pulses 0 to 6 are generated in the time slots 251 to 254, which pulses are used in a way yet to be described for calculating the partial sum signals which are transmitted to the individual conference-related connectors in the next succeeding pulse bracket $P_{n+1}$. Moreover, a clear pulse CP is generated during the last time slot 255 of the pulse bracket $P_n$ with which a summing register is cleared as described below in order to prepare it for summing the received PCM signals of the next pulse bracket $P_{n+1}$.

It is also recognized from FIG. 1 that the time slots 251 to 255 for the non-conference-relevant signals are provided at the end of the pulse bracket $P_n$. But likewise this period in the pulse bracket $P_n$ could also be provided at another position, whereby the onset time of the control for the transmission of conference-relevant signals on the one hand and for the calculation of partial sum signals on the other hand, which control is yet to be described, would be different, and the periods of the receiving and processing of the PCM signals would not coincide with the current pulse bracket $P_n$.

The time slots 000 to 245 may be set as receiving time slots RTS or transmitting time slots TTS. The time slots 246 to 250 may be set as receiving time slots RTS for audible tones which are relevant to the conference, so that they are not involved as transmitting time slots TTS for central conference control circuit. Reserving these time slots as transmitting time slots TTS is prevented within the central conference control circuit described later. The same holds true for the period of non-conference-relevant signals and for the time slots 251 to 255. The time slots 000 to 250 may therefore be set as transmitting time slots TTS of the conference-related stations and for audible tones in the central conference control circuit as receiving time slots RTS, if necessary with the relative addresses of the conference-related connectors assigned. The time slots 000 to 245 may moreover be set as transmitting time slots TTS of the central conference control circuit with respective relative addresses assigned.

Moreover, in FIG. 1 allowable limiting positions for a precursor or follow-up of parts of the yet to be described central conference control circuit are shown, which will later be explained.

Figure 2:
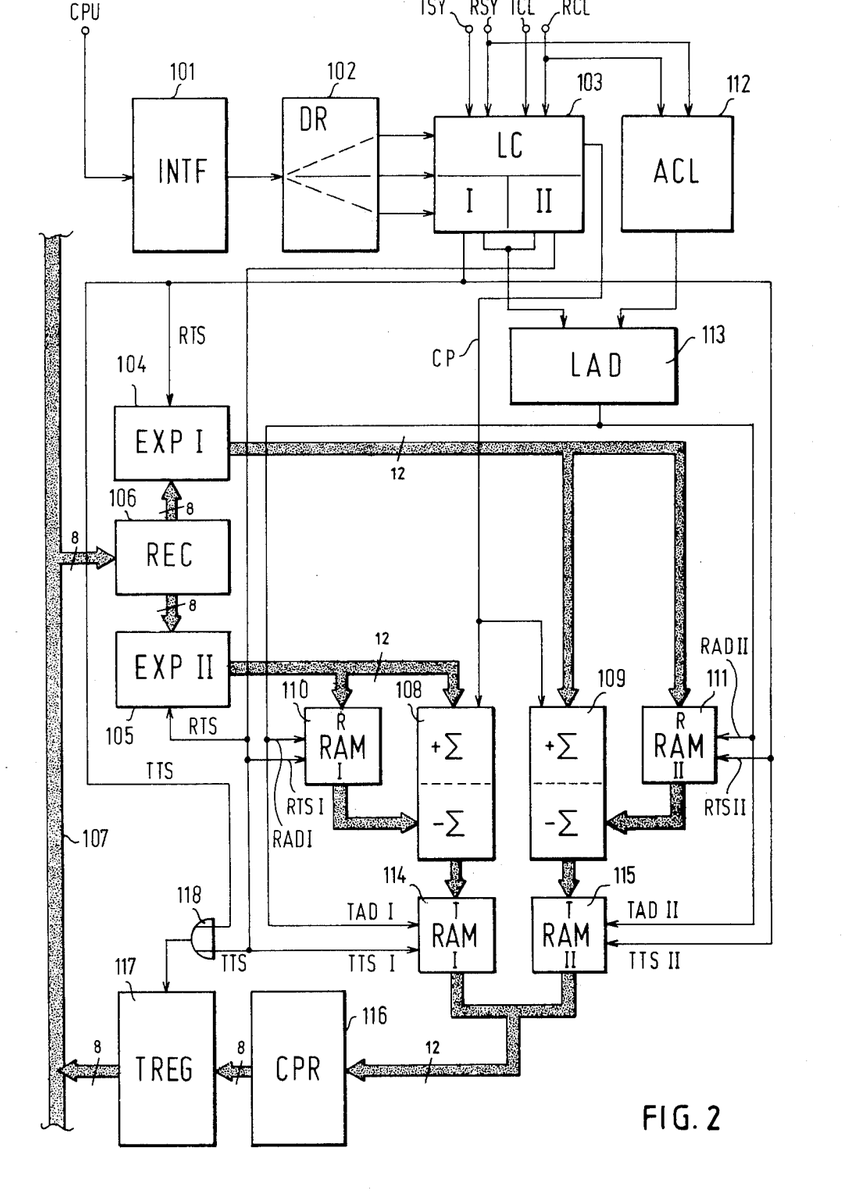
FIG. 2 shows a figure for the principle of a conference control circuit which operates by the process according to the invention.

FIG. 2 shows the principle of an embodiment example of a central conference control circuit which is suitable for carrying out the process according to the invention. This control circuit contains two conference-processing channels I and II which are controlled by logic control circuits common to them.

A central processing unit CPU is connected by way of an interface 101 with a distributing register 102. The central processing unit CPU is for example a control computer such as is usually used in time-division multiplex communication networks. This control computer manages a list of conference-related stations and respectively assigns them a three-figure binary relative address which during a conference connection also serves for deriving relative address signals of storage registers yet to be described. The mode of operation of the central processing unit CPU is familiar to one skilled in the art and therefore need not be described further here.

The distributing register 102 separately takes over from the interface 101, by processing channels I and II the set and clear commands for transmitting time slots TTS and receiving time slots RTS as well as the respectively assigned time slot members and relative addresses in the opposite prescribed arrangement and relays these signals to a logic control circuit 103, from which relative address signals and read/write pulses are emitted as control signals for the storage or the reading, in a manner yet to be described, of PCM signals which are to be received or transmitted. This logic control circuit 103 is described further in more detail on the basis of FIG. 3.

The logic control circuit 103 in turn is controlled by the time slot sequence clock pulses RCL and TCL and by the related time slot synchronizing signals RSY and TSY and periodically, at a set receiving time slot RTS for its duration, it gives an opening pulse to an expander 104 or 105, to which the eight-digit PCM signals receiving from a multiplex line with a receiver 106 are fed. The expander 104 or 105 serves to linearize the 8-digit PCM signals and correspondingly yields 12-digit linear words. The expander 104 is provided for the processing channel I, the expander 105 for the processing channel II. Each expander can for example be designed as a programmable read-only memory, for the addressing of which the seven lowest-number bits of the eight-digit signal word are used. The highest numbered bit remains as it is, and, in the algebraic processing of PCM signals which is yet to be described, it is used to control an adder-subtractor unit with a summing register 108 or 109.

The linear words are fed into the respective processing channel I or II parallel to a receiving storage register 110 or 111 as well as to the adder-subtractor unit with summing register 108 or 109. In this way they are added on, practically upon their arrival in the respective current pulse bracket, added on on the one hand in the receiving storage register and on the other hand are added on continuously in the adder-subtractor unit 108 or 109, so that the respective assigned summing register, by the end of the period of conference-relevant signals of the current pulse bracket, contains the signal sum of this pulse bracket. The temporary storage in the receiving storage register 110 or 111 results from relative address signals and write pulses emitted by the logic control circuit 103.

The respective summing register of the adder-subtractor unit 108 or 109 is cleared immediately before the first receiving time slot RTS of a pulse bracket by a clear pulse CP emitted by the logic control circuit 103 (FIG. 1) in order to ensure the zero setting required for the renewed summing of conference-relevant signals of the respective pulse bracket.

Moreover an auxiliary clock pulse generator 112 is provided which is controlled by the receiving time slot sequence clock pulse RCL and by the receiving time slot synchronizing signal RSY, and at its output emits a clock signal with double the frequency of the time slot sequence clock pulse of 2.048 MHz. This clock pulse controls a logic addressing circuit 113, which according to the example shown in FIG. 1 generates relative addresses with seven clock pulses, which addresses for example are provided for six conference-related receiving-transmitting stations. Moreover, the logic addressing circuit 113 controls read pulses for the receiving storage registers 110 and 111 as well as write pulses for the transmitting storage registers 114 and 115 for signal processing during the period of non-conference-relevant signals. In addition, it emits the relative addresses for the storage registers 110,111,114 and 115 during the period of conference-relevant signals, in a manner yet to be described. The registers 110,111,114 and 115 are memories with random access (RAM).

During one clock pulse emitted by the auxiliary clock pulse generator 113, the signal value, stored temporarily in the respective receiving storage register 110 or 111 under a certain relative address, is read out to the adder-subtractor unit 108 or 109 and subtracted from the signal sum contained in the respectively assigned summing registers. The partial sum, freed of its information content in this manner and thus subscriber-specific, is written into the respective transmitting storage register 114 or 115 of the processing channel I or II with the use of the same relative address.

At the start of the next succeeding pulse bracket, the partial sum signals stored temporarily in the transmitting storage registers 114 and 115 may be read out under control by the logic control circuit 103 and with the use of the relative address signals already mentioned, and by way of a compressor 116 provided in common for both processing channels I and II can be fed to a transmitting synchronizing storage register 117, while at the same time further new PCM signals can be received from the conference-related connectors. The compressor 116 converts the 12-digit linear words fed to it into nonlinear eight-digit signal words which are synchronized with the transmitting time slot. Sequence clock pulse TCL in the transmitting synchronizing storage register 117, and, in connection with the time slot assigned and set for the respective relative address, is read out by way of an OR element 118 and transmitted by way of the multiplex line 107 to the conference-related stations; i.e., the stations actually involved in a given conference. The transmitting storage registers 114 and 115 are advantageously controlled in such a way that they emit the twelve digit signal word in a time precursor of ½ time slot, in order to compensate for the unavoidable conversion time of the compressor 116. This precursor is designated and represented as compressor precursor in FIG. 1.

An asynchronous action between the transmitting time slots and the receiving time slots is allowable up to a certain time slot interval, which means that in the most unfavorable case the transmitting time slot 000 may coincide with the receiving time slot 255, since the subscriber-specific partial sum calculation is terminated in time after the first half of the receiving time slot 254 and thus a precursor of ½ time slot is available in order to be able to set the transmitting time slot 000 if necessary.

It may be seen that during the period of time slots 000 to 250 of the respective current pulse bracket, the receiving storage registers 110 and 111 and transmitting storage registers 114 and 115 can temporarily store PCM signals received independently of one another or emit PCM signals to be transmitted.

If a conference connection is to be carried out in the above-described embodiment example of five time slots for non-conference-relevant signals, with more stations than can be processed in this period of the pulse bracket by auxiliary clock pulses, then in the one processing channel, program-controlled by the central processing unit, a processing of the PCM signals from six stations, for example, can be carried out and additionally a so-called dummy time slot can be set as a transmitting time slot, to which a receiving time slot is assigned in the other processing channel, in which likewise up to six stations for example can be serviced. The dummy receiving time slot of the one processing channel then is thus a dummy transmitting time slot in the other processing channel and vice-versa. In this way two partial conference connections are created, the call sum signals of which are exchanged and thus are run up in the two summing registers of the adder-substractor units 108 and 109 for the respective total call signal sum. The partial sum of the respective other partial conference connection is thereby received delayed by one pulse bracket, i.e., by 125 microseconds which, however, has no harmful effects by reason of the extraordinarily rapid mode of operation of the control described here.

By this process any number of speech and/or tone signals of conference station connections can be mixed, and it is possible to line up two conference station connections or, with more processing channels, even more conference station connections.

Figure 3:
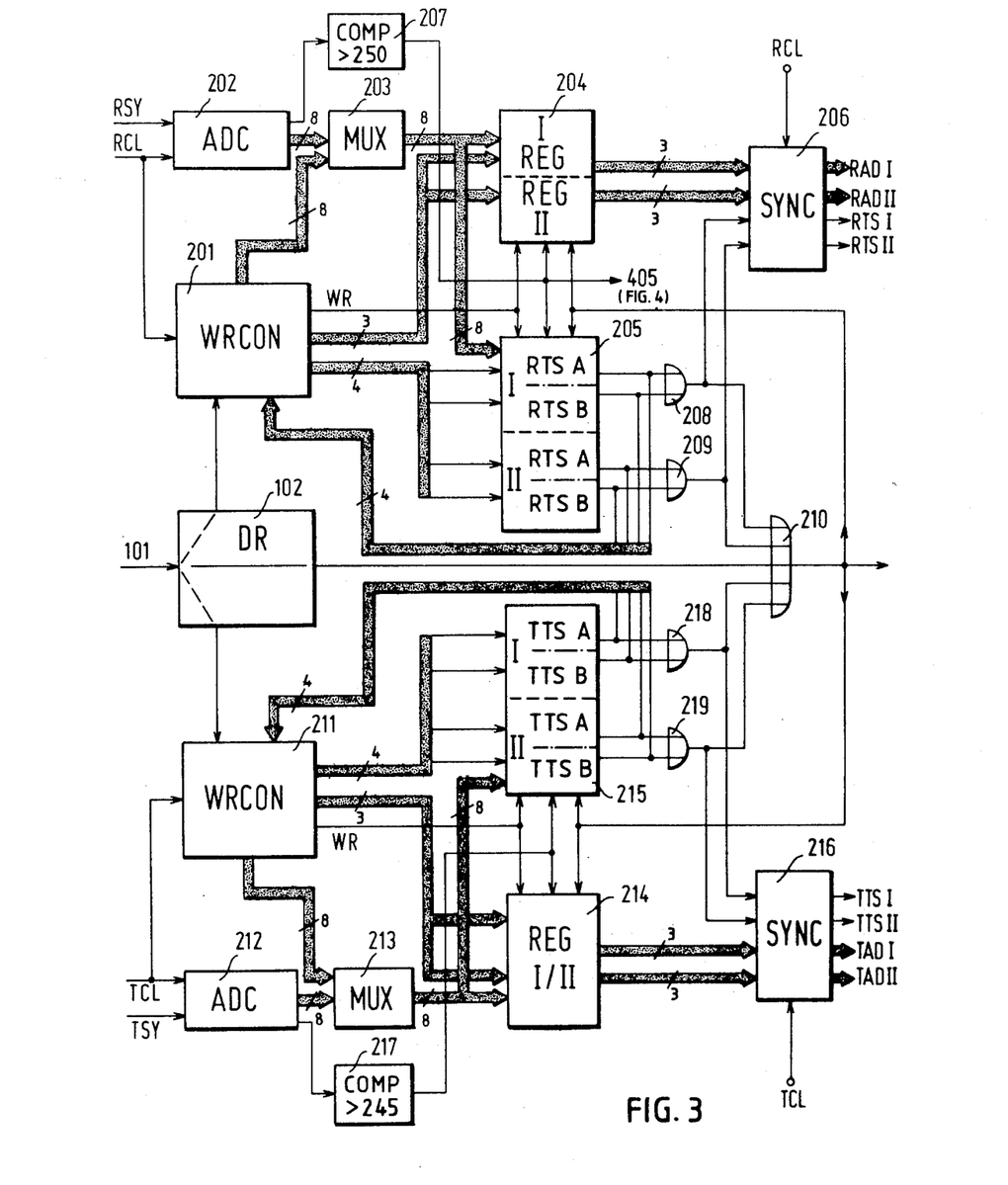
FIG. 3 shows the mode of operation in principle of a logic control circuit for deriving relative address signals and read/write pulses during one pulse bracket.

FIG. 3 shows the construction principle of the logic control circuit 103 according to FIG. 1. It is controlled by the control signals received from the central processing unit CPU, including the receiving time slot sequence clock pulse RCL, the receiving time slot synchronizing signal RSY, the transmitting time slot sequence clock pulse TCL and the transmitting time slot synchronizing signal TSY. The circuit arrangement shown in FIG. 3 is divided into two segments of the same structure, the upper one of which serves for deriving the control signals for the receiving process and the lower for deriving the control signals for the transmitting process. The derivation of control signals for the receiving process will first be described.

With the receiving time slot sequence clock pulse RCL and the receiving time slot synchronizing signal RSY, a modulo 256 address counter 202 is controlled which counts the receiving time slot sequence clock pulse RCL and transmits the time slot numbers as eight-digit address words to a multiplier 203, by way of which they address an address register 204 and a time slot register 205. In the address register 204 the three-digit relative addresses of the conference-related stations are stored by a read/write control 201 in a manner yet to be described, and for this it has a capacity corresponding to the maximum possible number of conference-related stations per processing channel I or II. Its width is therefore at least 3 bits, and it is divided into two segments I and II which are assigned to the processing channels I and II. This division is necessary since in the two processing channels I and II the same receiving time slot RTS can be set in regard to audible tones to be transmitted. The address register 204 as assigned to certain receiving time slots RTS emits three-digit relative address signals which in a manner yet to be described are relayed to the respective processing channel I or II for temporary signal storage, for which purpose they are first fed to a synchronizing circuit 206 which is controlled by the receiving time slot sequence clock pulse RCL and can be constructed as a temporary memory.

The time slot register 205 has a width of 4 bits and is divided into four periods of which two periods RTSA and RTSB are assigned to the processing channel I and the processing channel II respectively. The time slot register 205 is operated as a circulating register, and for this it is likewise controlled by the read/write control 201.

The read/write control 201 is controlled by the central processing unit CPU, on the one hand through the receiving time slot sequence clock pulse RCL, and on the other hand through relative addresses and receiving time slot set commands by way of the distributing register 102. Eight-digit receiving time slot numbers of set receiving time slots are fed to the multiplexer 203, so that the latter, in a set receiving time slot, addresses the two registers 204 and 205 by superimposing an address signal in the continuous address stream from the address counter 202. Moreover, the read/write control emits read/write pulses to the two registers 204 and 205 by way of a line WR. Besides this it transmits the respective three-digit relative addresses belonging to a set receiving time slot RTS to segment I or II, depending on the processing channel, of the address register 204, since the latter at its respectively assigned time slot is addressed by way of the multiplexer 203. Other outputs of the read/write control 201 serve for continuous storage in the four segments of the time slot register 205. In the respective first half clock pulse of the time slot sequence clock pulse RCL, the four segments of the time slot register 205 are read by the read/write control 201 and in the second half clock pulse are written in in turn. If a set command for a receiving time slot RTS occurs during the presence of the respective read register content in the read/write control 201, then the respective read information is updated accordingly and in this form is again written in into the time slot register 205. During the reading, the information in the time slot register 205 is also fed by way of an OR element 208 or 209 to the synchronizing circuit 206.

The segments RTSA and RTSB of the respective part I or II of the time slot register 205 may therefore be conceived of as tracks of a circulating memory, where into the first track, e.g. RTSA, only bits indicating that a time slot is not set are written in. Into the second track, e.g. RTSB are written in only bits which indicate the set state of a time slot under the respective time slot number involved, as a register address. After the reading the synchronizing circuit 206 transmits these bits, along with the relative address signals RADI and RADII, as read/write pulses for the receiving storage registers 110 and 111 (FIG. 2) and controls these latter, in a manner already described, during the period of conference-relevant PCM signals of the respective pulse bracket.

The construction of the time slot register 205 in the form of memory tracks RTSA and RTSB provided for each processing channel I and II is necessary in order to be able to erase any bit pattern which may be present in a track after the triggering of the conference control circuit within one pulse bracket period and then put this track into operation again through a clear signal which is delayed with respect to the triggering action. Moreover, when a conference connection is broken, a command signal can be transmitted from the central processing unit through which the clearing of the respective processing channel is indicated. Then for this only an exchange of the track already used as working memory is necessary. In this way a quicker breakup of the conference connection is insured, which otherwise could occur only through the respective clearing of all the time slots used and thus would go very slowly.

A comparator 207 compares the receiving time slot numbers counted with the address counter 202 continuously with a preset value 250, so that when this value is exceeded it transmits a clear signal for the two registers 204 and 205. This prevents control signals from still being sent to the receiving storage registers 110 and 111 (FIG. 2) after time slot 250.

Starting with the receiving time slot 251 and up to the receiving time slot 255, the read/write pulses as well as the relative address signals are generated and transmitted exclusively from the logic addressing circuit 113 already described.

The lower part of the logic control circuit shown in FIG. 3 operates similarly to the upper part in transmitting operation, but yields the relative address signals TADI and TADII as well as read/write pulses for the transmitting storage registers 114 and 115 during the period of conference-relevant signals of the respective current pulse bracket. A modulo 256 location counter 212, by way of a multiplexer 213, addresses an address register 214 for the relative addresses assigned to the transmitting time slots. The location counter 212 is controlled by the transmitting time slot sequence clock pulse TCL and the transmitting time slot synchronizing signal TSY from the central processing unit CPU (FIG. 2). The transmitting time slot sequence clock pulse TCL also controls a read/write control 211, which also receives the signals to be stored by way of the distributing register 102 from the central processing unit CPU. The two registers 214 and 215 operate similarly to the manner already described for the registers 204 and 205, wherein the time slot register 215 and its two parts I and II for the two processing channels I and II and two respective segments TTSA and TTSB operate by the circulating principle already explained. The address register 214, in contrast to the address register 204 is not divided into two segments corresponding to the processing channels I and II, since in one respective transmitting time slot by logic only one processing channel can operate in transmission operation. The information contained in the register 214 and 215, with a set assigned transmitting time slot TTS, is output as three-digit relative address signals by way of or elements 218 and 219 to a synchronizing circuit 216, which yields the already described control signals for the transmitting storage registers 114 and 115 and is controlled by the transmitting time slot sequence clock pulse TCL.

A comparator 217 is preset on transmitting time slot number 245 and when it is exceeded it transmits a clear signal for the two registers 214 and 215 during the addressing process carried out with the location counter 212, so that these registers can transmit the control signal described only for time slots 000 to 245, since only during this period in the respective current time bracket is a setting of transmitting time slots TTS in the central conference control circuit possible.

FIG. 3 also represents an OR element 210 which is controlled by the output signals of the OR elements 208, 209, 218 and 219 as well as by a signal from the distributing register 102. The output signal of this OR element 210 serves automatically to cause a partial switching off of the conference control circuit when the latter is not in use. In this way it is possible to keep the conference control circuit in a ready state in a manner not represented here, in which state the power consumption is considerably reduced.

The OR element 210, controlled by a suitable output signal from the distributing register 102, records a receiving or transmitting time slot, possibly one still stored in one of the time slot registers 205 and 215, at the end of each pulse bracket. In addition, on the basis of a characteristic bit in the distribution register 102, it is verified whether the respective last command received from the central processing unit CPU was a set command for a time slot. If none of these conditions is satisfied, then the output signal of the OR element 210, in a manner not represented in detail here, causes a switching off of the operating voltage for individual function groups of the central conference control circuit. Such function groups may for example be the adder-subtractor unit 108 or 109 with the summing register belonging to it, the receiving storage registers 110,111, the transmitting storage registers 114, 115, the expanders 104, 105, the compressor 116, the auxiliary clock pulse generator 112 and the logic addressing circuit 113. At the same time the registers 204, 205, 214 and 215, when the above-mentioned condition exists, are switched into a type of operation in which the internal storage condition is maintained, with reduced power consumption.

Then when a new set command for one time slot is input in the distributing register 102 from the central processing unit CPU, the register 204, 205, 214 and 215 can be activated rapidly enough so that they can still be read or written with the activating operating clock pulse in the circulating operation already described.

The switched-off function groups can be restored to operating readiness within a time of about 1 to 2 microseconds.

Figure 4:
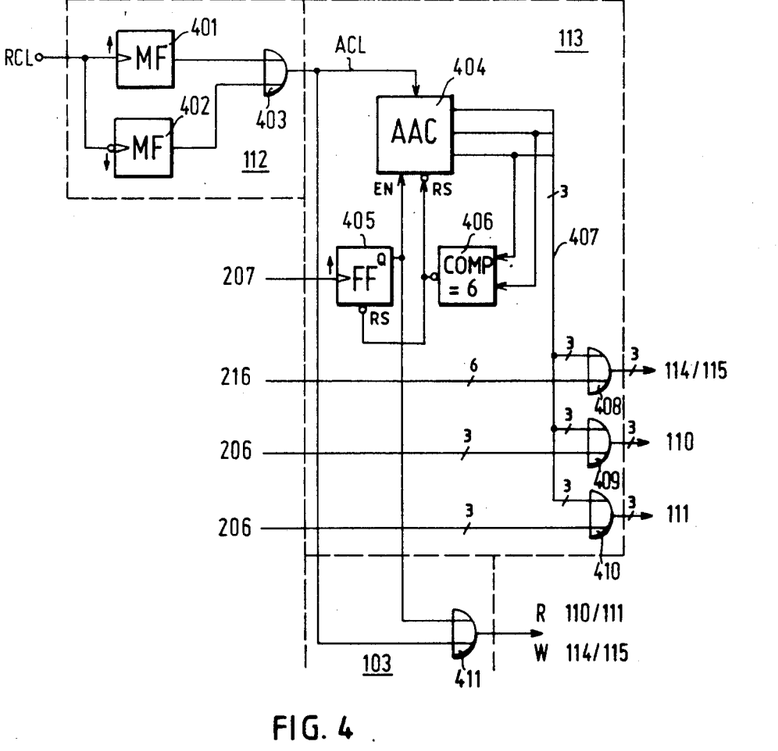
FIG. 4 shows the mode of operation in principle of a logic address circuit in combination with an auxiliary clock pulse generator.

FIG. 4 represents a possible embodiment of the logic addressing circuit 113 (FIG. 2) in combination with the auxiliary clock pulse generator 112. The two function units are respectively surrounded by a broken line, and it is also denoted that the logic addressing circuit also controls part of the logic control circuit 103 in a manner yet to be described.

The auxiliary clock pulse generator 112 contains two slope-controlled monostable circuits 401 and 402 as well as an OR element 403. The two monostable circuits 401 and 402 operate with equal time constants and are respectively controlled by the receiving time slot sequence clock pulse RCL. The monostable circuit 401 corresponds to positive slopes of the receiving time slot sequence clock pulse, the monostable circuit 402 through its inverting input corresponds to negative slopes of the receiving time slot sequence clock pulse. In this manner pulses of equal length arise from the outputs of the two monostable circuits 401 and 402 which pulses, by being combined in the OR element 403, form an auxiliary clock signal ACL on the output of the latter which signal has double the frequency of the receiving time slot sequence clock pulse RCL. The synchronizing signal RS4 is omitted in the embodiment of FIG. 4 because the circuits 401 and 402 are monostable and reset themselves.

The auxiliary clock signal ACL is fed within the logic addressing circuit 113 to an auxiliary location counter 404 which emits relative address signals 0 to 6 at three outputs synchronously with the auxiliary clock signal ACL. The auxiliary location counter 404 has a clock pulse clear input EN as well as an inverting reset input RS. A comparator 406 transmits a signal to the reset input RS when the relative address signal 6 is reached. Synchronously with the next succeeding auxiliary clock pulse, the auxiliary location counter 404 is then reset. The output signal of the comparator 406 is also fed to a bistable circuit 405. This is slope-controlled and is triggered at its clock input by the output signal of the comparator 207 (FIG. 3), which occurs when the period of non-conference-relevant signals in the respective pulse bracket starts. The bistable circuit 405 is actuated by this signal in such a way that its Q output signal on the clock-pulse clear input EN clears the auxiliary address counter 404 for the respective counting process. When the relative address signal 6 is reached, the bistable circuit 405 is again reset by the output signal of the comparator 406 in its reset input RS. This process takes place through the two NOT operations at the output of the comparator 406 or at the reset input RS of the bistable circuit 405.

The relative address signals which the auxiliary location counter 404 transmits are fed by way of a three-wire line 407, in parallel, to three OR elements 408, 409, 410, which then emit at their outlets the relative address for the receiving storage registers 110 and 111 as well as for the transmitting storage registers 114 and 115. This involves relative addresses for the period of non-conference-relevant signals in the respective pulse bracket. In the same manner, however, the three OR elements 408, 409 and 410 also emit the relative addresses for the above-mentioned receiving and transmitting storage registers during the period of conference-relevant signals in the respective pulse bracket, since they are fed at their second inputs with the relative address signals of the synchronizing circuits 206 and 216 (FIG. 3).

The logic addressing circuit 115 therefore on the one hand emits relative addresses which fall in the time interval in which the synchronizing circuits 206 and 216 emit only the relative address 0, since, because of the output signals of the comparators 207 and 217 during the period of non-conference-relevant signals, no relative address signals are received from the address registers 204 and 214. During the period of conference-relevant signals, on the other hand, the logic addressing circuit 113 emits the relative addresses which correspond to the relative address signals received from the synchronizing circuits 206 and 216. In this manner the OR elements 408, 409 and 410 yield the relative addresses which are required for the conference control circuit shown in FIG. 2 during the respective whole pulse bracket.

FIG. 4 also shows an AND element 411 which belongs to the logic control circuit 103. This AND element 411, during the period of non-conference-relevant signals in the respective pulse bracket, emits the read pulses for the receiving storage registers 110 and 111 and the write pulses for the transmitting storage registers 114 and 115. This is achieved through control by the Q output signal of the bistable circuit 405, which is a top signal during the period of non-conference-relevant signals. This signal makes the auxiliary clock pulses ACL act on the AND element 411, so that at the output of the AND element 411 they are usable as read or write pulses during the period of non-conference-relevant signals for the conference control circuit shown in FIG. 2.

Figure 5:
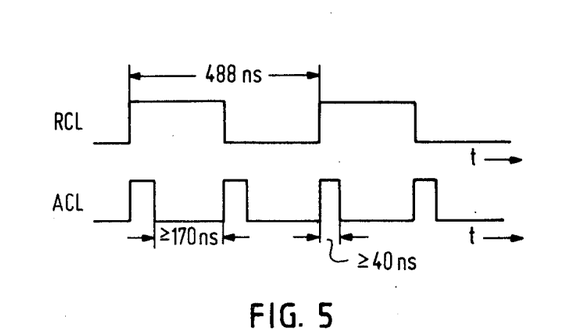
FIG. 5 shows the time assignment between a receiving time slot sequence clock pulse and an auxiliary clock pulse.

In FIG. 5 the receiving time slot sequence clock pulse RCL is represented in a time relation to the auxiliary clock signal ACL. Here it can be recognized that the time constants of the two monostable circuits 401 and 402 (FIG. 4) must be so dimensioned that in one time slot clock period of 488 microseconds the auxiliary clock pulse has a pulse duration of about 40 microseconds. This pulse duration is sufficient to step up the auxiliary address counter 404 (FIG. 4), and in the pulse pauses of about 170 microseconds in length to derive the write and read pulses for the receiving or transmitting registers of the conference control circuit shown in FIG. 2. During the pulse pauses in the auxiliary clock pulse ACL, a reading of the PCM signal values from the receiving storage registers 110 and 111 occurs, and a partial summing in the adder-subtractor units 108, and also the subsequent writing of the calculated partial sums in the transmitting storage registers 114 and 115 occurs, for each respective relative address. The auxiliary clock signal ACL is optimized in time with respect to the cycle times of the storage registers and to the calculating time of the adder-substractor units.

I claim:

1. In a process for control of the transmission of PCM signals between stations of a PCM time-division multiplex communications network in a conference service by means of a central conference control circuit, said network being of the type in which a central processing unit allots to each station involved a transmitting time slot within a cyclically repeating time bracket of known lengths and a receiving time slot with said cyclically repeating time bracket, and, in which, in one time bracket, PCM signals transmitted from the conference-related stations and received in the central conference control circuit are summed algebraically, stored temporarily, and for transmission to the respective conference-related stations are subjected to a partial summation, with the elimination of the PCM signal emitted by each respective station, in which partial summation the PCM signals corresponding to the partial sums, are transmitted during another time bracket to the conference-related stations, and in which time slots are provided within predetermined portions of the respective time bracket for the transmission of signals not relevant to the conference; the improvement which comprises:
  (a) performing said algebraic summation directly upon the receipt of the PCM signals,
  (b) simultaneously with step (a) performing said temporary PCM signal storage in a manner specific to the station only until the expiration of the next succeeding time slots for signals not relevant to the conference,
  (c) temporarily storing results of said partial summation in said slots for transmission of signal not relevant to the conference; and
  (d) transmitting the PCM signals corresponding to the partial sums to the conference-related stations immediately after said slots.

2. A process as defined in claim 1, characterized in that the time slots for the signals not relevant to the conference are located at the end of each time bracket, that the received PCM signals are temporarily stored only for the duration of the current time bracket and that the transmission step begins with the start of the time bracket immediately following the current time bracket.

3. A process as defined in claim 1 characterized in that relative addresses assigned to the conference-related stations by the central processing unit are used for temporary storage of the received PCM signals and the partial sums as well as for transmitting the partial PCM signals corresponding to the sums.

4. A process as defined in claim 1, characterized in that the partial summation as well as the temporary storage of the partial sums are controlled by auxiliary clock signals the frequency of which is preferably double that of time slot sequence clock pulses.

5. A process as defined in claim 4, characterized in that the auxiliary clock signals also control generation of relative address signals and of read/write pulses for the temporary storage of the partial sums.

6. A process as defined in claim 1, characterized in that the signal sum obtained by the algebraic summation up to the start of the time bracket portion allotted to signals not relevant to the conference, is stored for the duration of said time bracket portion and that the partial sums are produced by auxiliary-clock-pulse-controlled subtraction of the individual PCM signals stored temporarily up to the start of the said portion, from the signal sum.

7. A process as defined in claim 6, characterized in that read/write pulses and relative address signals for triggering temporary stores for the receiving and transmitting process are generated separately during the period of signals relevant to the conference in one time bracket.

8. A process as defined in claim 7, characterized in that the respective functions of receiving and transmitting are controlled by receiving and transmitting time slot sequence clock pulses modulo-N counting of respective receiving and transmitting time slot sequence clock pulses in relative address registers for respective receiving or transmitting time slot register, a respective read/write control of which is activated according to an assignment of relative addresses to certain receiving or sending slots, where N is the number of time slots per time bracket.

9. A process as defined in claim 8, characterized in that the respective read/write control, cyclically with the address counting, in the first half clock pulse of a receiving or transmitting time slot sequence clock signal, causes a reading of the receiving or transmitting time slot register, and in the second half clock pulse causes a writing of the read contents, after updating by a time slot set command emitted by the central processing unit in connection with an allotted relative address which at the same time is emitted in the relative address register, and that when a set receiving or transmitting the time slot occurs in the train of the cyclical read/write process, the read/write control causes a reading of the contents of the respective relative address register and time slot register and a relaying of the read signals as relative address signals and write pulses for the temporary storage of the received PCM signals for a relaying of the read signals as relative address signals and read pulses for transmitting the partial sums to the conference-related connectors.

* * * * *